(12) United States Patent
Jaffari et al.

(10) Patent No.: US 10,971,068 B2
(45) Date of Patent: **\*Apr. 6, 2021**

(54) SYSTEM AND METHODS FOR THERMAL COMPENSATION IN AMOLED DISPLAYS

(71) Applicant: Ignis Innovation Inc., Waterloo (CA)

(72) Inventors: Javid Jaffari, Kitchener (CA); Gholamreza Chaji, Waterloo (CA); Tong Liu, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,892

(22) Filed: Sep. 20, 2019

(65) Prior Publication Data

US 2020/0020279 A1    Jan. 16, 2020

Related U.S. Application Data

(63) Continuation of application No. 15/979,658, filed on May 15, 2018, now Pat. No. 10,460,669, which is a
(Continued)

(51) Int. Cl.
*G09G 3/3258* (2016.01)
*G06F 30/23* (2020.01)
(Continued)

(52) U.S. Cl.
CPC .......... *G09G 3/3258* (2013.01); *G06F 30/23* (2020.01); *G09G 3/3233* (2013.01); *G09G 3/3291* (2013.01); *G06F 2119/08* (2020.01); *G09G 2300/0819* (2013.01); *G09G 2310/0289* (2013.01); *G09G 2320/029* (2013.01);
(Continued)

(58) Field of Classification Search
CPC ................. G06F 2119/08; G06F 30/23; G09G 2300/0819; G09G 2310/0289; G09G 2320/0233; G09G 2320/0271; G09G 2320/029; G09G 2320/041; G09G 2320/0626; G09G 2320/0693; G09G 3/3233; G09G 3/3258; G09G 3/3291
See application file for complete search history.

(56) References Cited

U.S. PATENT DOCUMENTS 10,134,348 B2 \* 11/2018 Cote ..................... G09G 3/3225
10,229,636 B2 \* 3/2019 Kim ..................... G09G 3/3233
(Continued)

OTHER PUBLICATIONS

Chinese Office Action dated Apr. 7, 2020 filed in co-pending Chinese Patent Application 201610285819.6.

*Primary Examiner* — Chun-Nan Lin
(74) *Attorney, Agent, or Firm* — Stratford Managers Corporation (57) ABSTRACT

Disclosed is a circuit and technique to determine the temperature of an AMOLED display in order to calibrate programming data signals. The temperature of selected pixels of a plurality of pixels in an AMOLED display is measured via one of several disclosed methods. A thermal sensor for the selected pixels may be used. A measurement of output voltage data may be used to estimate temperature. A finite element analysis model may be used based on consumed power of the selected pixel. The temperature data for the selected pixel is then interpolated to the neighboring non-selected pixels to estimate the temperature of those pixels.

12 Claims, 5 Drawing Sheets

Related U.S. Application Data continuation of application No. 15/289,138, filed on Oct. 8, 2016, now Pat. No. 9,997,110, which is a continuation of application No. 14/481,520, filed on Sep. 9, 2014, now Pat. No. 9,489,897, which is a continuation of application No. 12/958,655, filed on Dec. 2, 2010, now Pat. No. 8,907,991.

(51) Int. Cl.
   *G09G 3/3233* (2016.01)
   *G09G 3/3291* (2016.01)
   *G06F 119/08* (2020.01)

(52) U.S. Cl.
   CPC ............ *G09G 2320/0233* (2013.01); *G09G 2320/0271* (2013.01); *G09G 2320/041* (2013.01); *G09G 2320/0626* (2013.01); *G09G 2320/0693* (2013.01)

(56) References Cited

U.S. PATENT DOCUMENTS

| | | | | |
|---|---|---|---|---|
| 10,339,874 | B2* | 7/2019 | Won | G09G 3/3275 |
| 2003/0052844 | A1* | 3/2003 | Fish | G09G 3/3651 |
| | | | | 345/87 |
| 2008/0012804 | A1* | 1/2008 | Kim | G09G 3/3275 |
| | | | | 345/82 |
| 2008/0170004 | A1* | 7/2008 | Jung | G09G 3/3233 |
| | | | | 345/76 |
| 2008/0231558 | A1* | 9/2008 | Naugler | G09G 3/3233 |
| | | | | 345/76 |
| 2010/0103203 | A1* | 4/2010 | Choi | G09G 3/3283 |
| | | | | 345/690 |
| 2010/0188444 | A1* | 7/2010 | Okuyama | G09G 3/3648 |
| | | | | 345/691 |
| 2012/0139955 | A1* | 6/2012 | Jaffari | G09G 3/3258 |
| | | | | 345/690 |

\* cited by examiner

SYSTEM AND METHODS FOR THERMAL COMPENSATION IN AMOLED DISPLAYS

CROSS-REFERENCE TO RELATED APPLICATIONS

This application is a continuation of U.S. patent application Ser. No. 15/979,658, filed May 15, 2018, now allowed, which is a continuation of U.S. patent application Ser. No. 15/289,138, filed Oct. 8, 2016, now U.S. Pat. No. 9,997,110, which is a continuation of U.S. patent application Ser. No. 14/481,520, filed Sep. 9, 2014, now U.S. Pat. No. 9,489,897, which is a continuation of U.S. patent application Ser. No. 12/958,655, filed Dec. 2, 2010, now U.S. Pat. No. 8,907,991, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to active matrix organic light emitting device (AMOLED) displays, and particularly determining thermal conditions of the pixels of such displays.

BACKGROUND

Currently, active matrix organic light emitting device ("AMOLED") displays are being introduced. The advantages of such displays include lower power consumption, manufacturing flexibility and faster refresh rate over conventional liquid crystal displays. In contrast to conventional liquid crystal displays, there is no backlighting in an AMOLED display as each pixel consists of different colored OLEDs emitting light independently. The OLEDs emit light based on current supplied through a drive transistor. The power consumed in each pixel has a direct relation with the magnitude of the generated light in that pixel. As a result, the uneven power consumption profile, the anisotropic lateral heat conduction of the panel (e.g. lower conduction in the panel edges), and the differential heat convection in vertical orientation lead to a highly non-uniform surface temperature profile.

The non-uniformity of the temperature severely impacts the quality of the display by adding visual spatio-temporal artifacts. That is due to the strong thermo-electrical-optical coupling in the characteristics of the pixel circuits, such as the thermal dependency of the voltage-current characteristic of the thin film transistors (TFTs) that are used as drive transistors and their short-time threshold voltage aging rate. The drive-in current of the TFT determines the pixel's OLED luminance. Since the pixel circuits are voltage programmable, the spatial-temporal thermal profile of the display surface changing the voltage-current characteristic of the drive transistor impacts the quality of the display. The rate of the short-time aging of the thin film transistor devices is also temperature dependent. If the temperature of each pixel is known, proper corrections can be applied to the video stream in order to compensate for the unwanted thermal-driven visual effects.

However, determining the temperature of each pixel presents difficulties in the need for additional components such as thermal sensors and/or additional computational circuitry to analyze the performance of each pixel during the use of the display. Accurate yet efficient real-time extraction of surface thermal profiles is therefore needed. Such information is critical to provide proper compensation for the thermal effects in large area AMOLED displays.

SUMMARY

Aspects of the present disclosure include a current-biased, voltage-programmed display panel allowing measurement of temperature. The panel includes a plurality of pixels each including a drive transistor and an organic light emitting device coupled to the drive transistor. A controller is coupled to each of the plurality of pixels. The controller causes a programming voltage to be applied to the gate of the respective drive transistors to control the brightness of each pixel. The controller further reads data from selected ones of the plurality of pixels to determine the temperature of the selected ones of the plurality of pixels. The controller estimates the temperature of the other non-selected plurality of pixels based on the determined temperature of the selected ones of the plurality of pixels.

Another aspect of the present disclosure is a method of determining the temperature profile of an active matrix organic light emitting device display including a plurality of organic light emitting device pixels. Each pixel has a programming voltage input to determine brightness. The temperature of selected ones of the plurality of pixels is determined. The selected pixels are less than all of the plurality of pixels. The temperature of the rest of the non-selected plurality of pixels is estimated using the determined temperature of the selected ones of the plurality of pixels.

Another aspect of the present disclosure is a non-transitory machine readable medium having stored thereon instructions for determining a temperature profile of an active matrix organic light emitting device display including a plurality of organic light emitting device pixels. Each pixel has a programming voltage input to determine brightness. The instructions include machine executable code which when executed by at least one machine, causes the machine to determine the temperature of selected ones of the plurality of pixels, the selected ones being less than all of the plurality of pixels. The instructions also cause the machine to estimate the temperature of the rest of the non-selected plurality of pixels using the determined temperature of the selected ones of the plurality of pixels.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
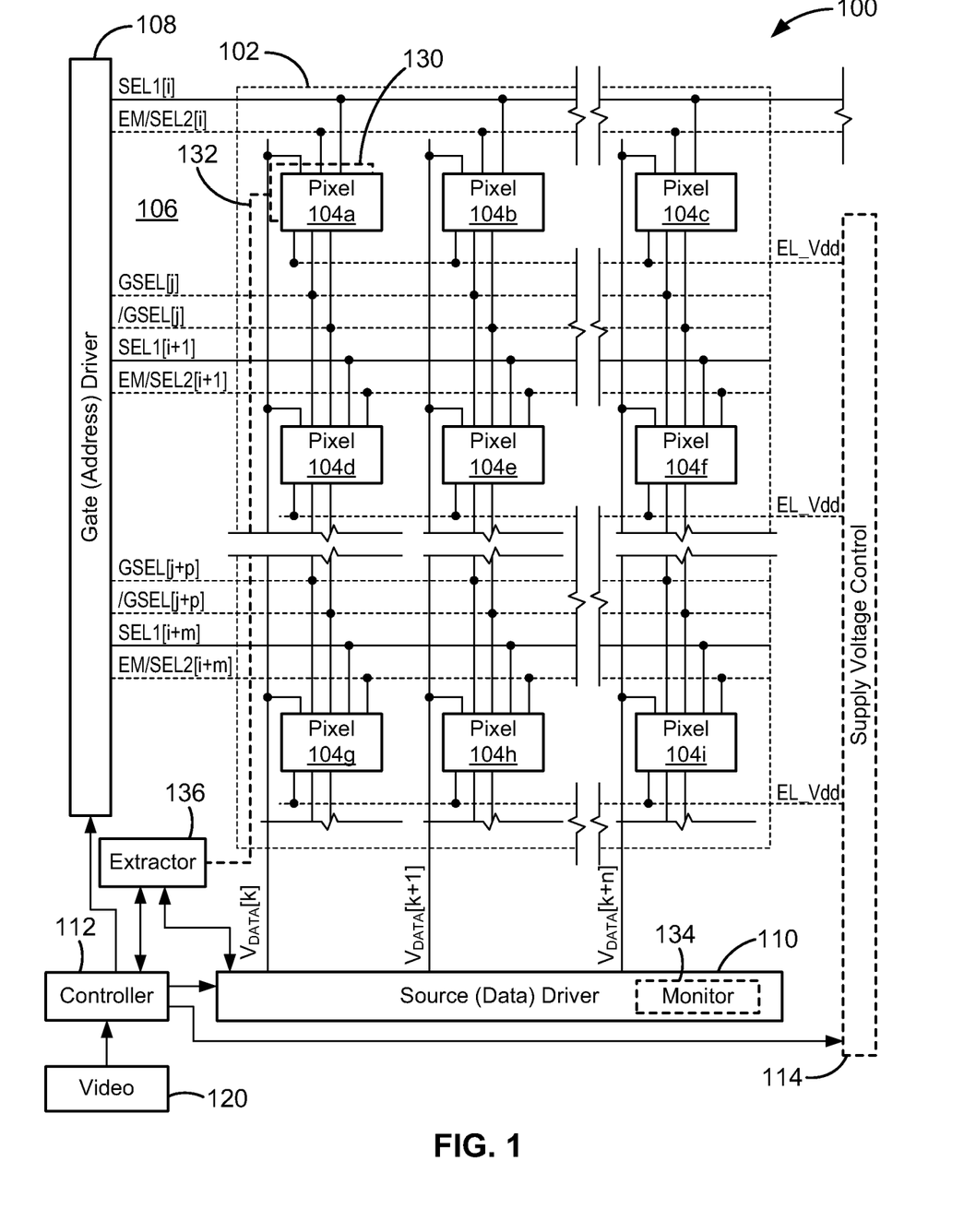
FIG. 1 is a block diagram of a AMOLED display with temperature compensation control.

FIG. 1 is an electronic display system 100 having an active matrix area or pixel array 102 in which an array of pixels 104*a-d* are arranged in a row and column configuration. For ease of illustration, only two rows and columns are shown. External to the active matrix area 102 is a peripheral area 106 where peripheral circuitry for driving and controlling the pixel area 102 are disposed. The peripheral circuitry includes a gate or address driver circuit 108, a source or data driver circuit 110, a controller 112, and an optional supply voltage (e.g., Vdd) driver 114. The controller 112 controls the gate, source, and supply voltage drivers 108, 110, 114. The gate driver 108, under control of the controller 112, operates on address or select lines SEL[i], SEL[i+1], and so forth, one for each row of pixels 104*a-i* in the pixel array 102. In pixel sharing configurations described below, the gate or address driver circuit 108 can also optionally operate on global select lines GSEL[j] and optionally /GSEL[j], which operate on multiple rows of pixels 104*a-i* in the pixel array 102, such as every two rows of pixels 104*a-d*. The source driver circuit 110, under control of the controller 112, operates on voltage data lines Vdata[k], Vdata[k+1], and so forth, one for each column of pixels 104*a-i* in the pixel array 102. The voltage data lines carry voltage programming information to each pixel 104*a-i* indicative of brightness of each light emitting device in the pixels 104*a-i*. A storage element, such as a capacitor, in each pixel 104*a-i* stores the voltage programming information until an emission or driving cycle turns on the light emitting device. The optional supply voltage driver 114, under control of the controller 112, controls a supply voltage (EL_Vdd) line, one for each row of pixels 104*a-i* in the pixel array 102.

The display system 100 may also include a current source circuit, which supplies a fixed current on current bias lines. In some configurations, a reference current can be supplied to the current source circuit. In such configurations, a current source control controls the timing of the application of a bias current on the current bias lines. In configurations in which the reference current is not supplied to the current source circuit, a current source address driver controls the timing of the application of a bias current on the current bias lines.

As is known, each pixel 104*a-i* in the display system 100 needs to be programmed with information indicating the brightness of the light emitting device in the pixel 104*a-i*. A frame defines the time period that includes a programming cycle or phase during which each and every pixel in the display system 100 is programmed with a programming voltage indicative of a brightness and a driving or emission cycle or phase during which each light emitting device in each pixel is turned on to emit light at a brightness commensurate with the programming voltage stored in a storage element. A frame is thus one of many still images that compose a complete moving picture displayed on the display system 100. There are at least two schemes for programming and driving the pixels: row-by-row, or frame-by-frame. In row-by-row programming, a row of pixels is programmed and then driven before the next row of pixels is programmed and driven. In frame-by-frame programming, all rows of pixels in the display system 100 are programmed first, and all of the pixels are driven row-by-row. Either scheme can employ a brief vertical blanking time at the beginning or end of each frame during which the pixels are neither programmed nor driven.

The components located outside of the pixel array 102 may be disposed in a peripheral area 106 around the pixel array 102 on the same physical substrate on which the pixel array 102 is disposed. These components include the gate driver 108, the source driver 110 and the optional supply voltage control 114. Alternately, some of the components in the peripheral area can be disposed on the same substrate as the pixel array 102 while other components are disposed on a different substrate, or all of the components in the peripheral area can be disposed on a substrate different from the substrate on which the pixel array 102 is disposed. Together, the gate driver 108, the source driver 110, and the supply voltage control 114 make up a display driver circuit. The display driver circuit in some configurations may include the gate driver 108 and the source driver 110 but not the supply voltage control 114.

In order to facilitate temperature compensation, two general methodologies may be used for the real-time and efficient extraction of the surface temperature profile of the AMOLED display system 100 in FIG. 1 for temperature compensation purposes. One method may extract the full temperature through the use of temperature data. The temperature data may be obtained from various voltage or current measurements or from limited thermal sensors on the AMOLED display system 100. Another method calculates the thermal profile from the video data from the AMOLED display system 100. This method relies on cutting the computational cost significantly with minimal estimation error via selection of limited pixels for temperature measurement. The methods may be performed by the controller 112 in FIG. 1, but other hardware and/or software may perform these methods such as a video processor or a digital signal processor on a device coupled to the display system 100.

FIG. 1 therefore shows the use of limited thermal sensors such as a thermal sensor 130 on a selected pixel 104*a* of the AMOLED display system 100. The thermal sensor 130 may be integrated on the pixel array 102 or there may be a separate substrate containing a matrix of the thermal sensor components. FIG. 1 shows the optional thermal sensor 130 corresponding to only one of a group of pixels such as the pixel 104a in the pixel array 102. The thermal sensor 130 is coupled to a monitor line 132 that is coupled to the controller 112. Other surrounding pixels such as the pixels 104b-i do not have a thermal sensor. Thus, there are many fewer thermal sensors 130 than pixels 104a-i. For example, all the pixels 104 may be divided into 5 by 5 segments and therefore for each 25 pixels, a single thermal sensor 130 is provided such as for the pixel 104a.

Figure 2:
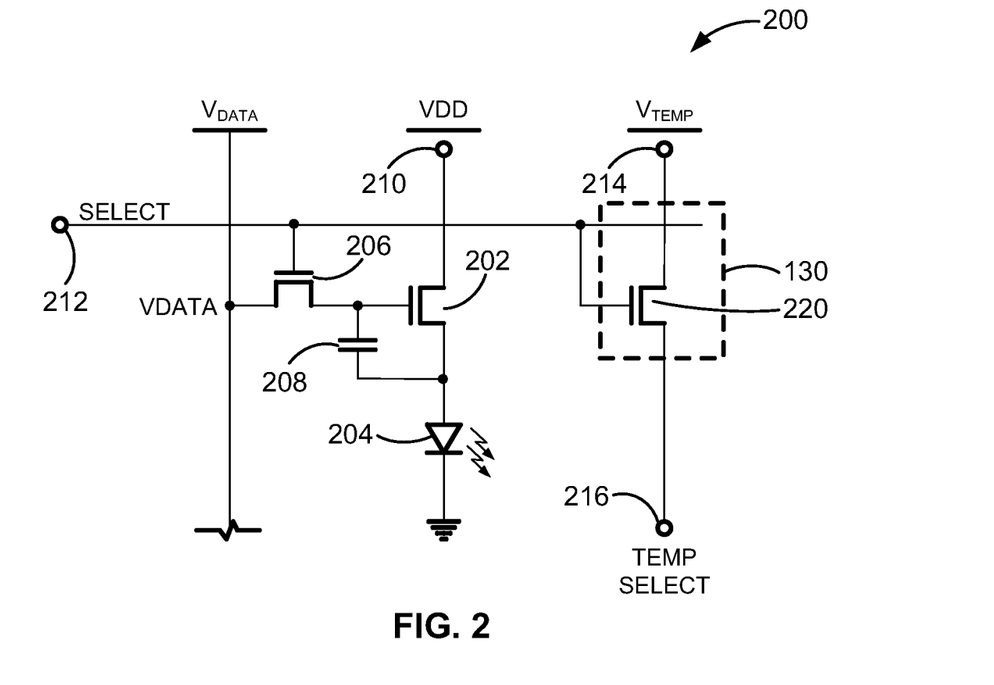
FIG. 2 is a circuit diagram of a drive circuit including a thermal sensor for a selected one of the pixels in the AMOLED display in FIG. 1.

FIG. 2 shows a driver circuit 200 for the thermal sensor 130 that is integrated in the driver circuit 200 for the pixel 104a in FIG. 1. The driver circuit 200 includes a drive transistor 202, an organic light emitting device ("OLED") 204, a select transistor 206 and a source capacitor 208. A voltage source 210 is coupled to the drive transistor 206. A select line 212 is coupled to the select transistor 206. The driver circuit 200 includes a monitor line 214 that is coupled to the drain of a thermal transistor 220 which is part of the thermal sensor 130. The thermal transistor 220 has a source that is coupled to a temperature select line 216. The current through the thermal transistor 220 is a function of the temperature of the pixel 104a. During the readout time, the select line 212 is pulled high which may be in parallel with the pixel programming cycle. The temperature select line 216 will be pulled low and therefore the monitor line 214 will provide access to the current of the transistor 220. Since the current of the transistor 220 will change based on temperature, temperature information may be extracted from this current. Thus, the temperatures of certain pixels in the pixel array 102 such as the pixel 104a are measured by activating the monitor line 214 via the select line 212.

Another method of determining the temperature of selected pixels is by measuring change in output voltage at different points in time which represents temperature of the pixel. Such data may be obtained by monitoring the change in pixel output voltage data such as by methods for detecting shifts in performance due to aging described in application Ser. No. 11/673,512 filed Feb. 9, 2007 (Publication No. 2007/0195020) hereby incorporated by reference. Monitoring a display for the effects of aging requires sampling data from the pixels at a slow rate such as every few frames. However, such data may also be used for thermal measurements based on changes in output voltage from selected pixels during the blanking intervals of each frame.

The temperature of a pixel may be determined based on output voltages measured on a driver circuit such as the data driver 110 that shown in FIG. 1 without the thermal sensor 130 in FIGS. 1 and 2 based on a calibration voltage applied to the gate of the drive transistor of selected pixels such as the pixel 104a during a blank frame or the blanking intervals of each frame. In this example, the data driver 110 has an optional monitor 134 for driving and monitoring the output voltage as shown in FIG. 1. An optional extractor block 136 calculates the temperatures of the selected pixels based on the voltage generated on the output voltage from an output voltage line 138. The data signals to the pixels 104a-i are calibrated for temperature based on the monitoring result (i.e., the change in output voltage). The monitoring result may be provided to the controller 112. The supply voltage may be used by the controller 112 to drive the current for the OLED which in turn represents the temperature of the pixel 104.

Figure 3:
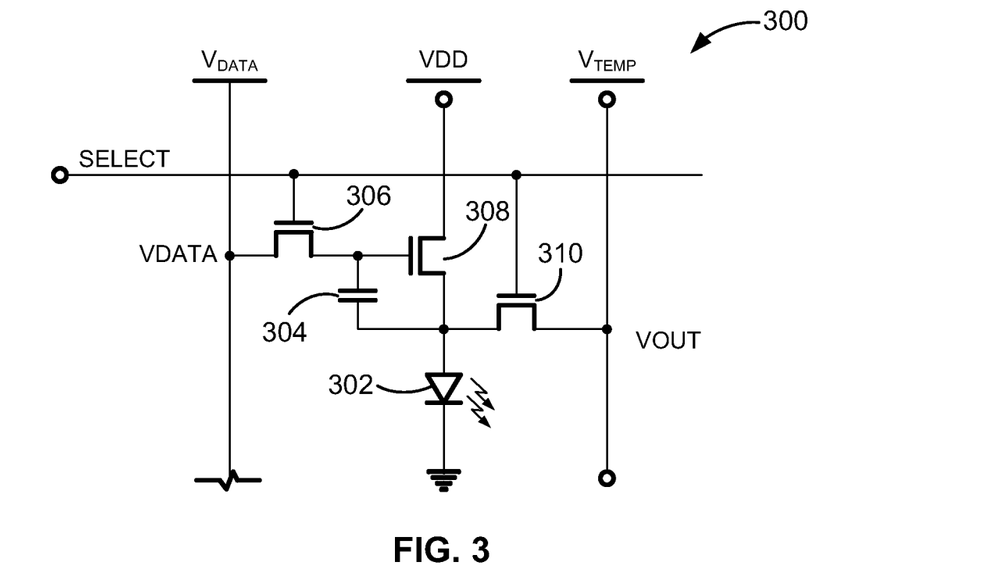
FIG. 3 is a circuit diagram for an alternate drive circuit that allows sensing of voltage data from a selected pixel to determine pixel temperature in the AMOLED display in FIG. 1.

FIG. 3 shows an example of a driver circuit 300 that may be used for selected pixels such as the pixel 104a to determine temperature from separate voltage measurements eliminating the need for a dedicated thermal sensor. The driver circuit 300 in FIG. 3 includes an OLED 302, a storage capacitor 304, a switch transistor 306, and a drive transistor 308.

The drain terminal of the drive transistor 308 is connected to a power supply line VDD from the voltage drive 114 in FIG. 1, and the source terminal of the drive transistor 308 is connected to the OLED 302. The switch transistor 306 is connected between a data line VDATA and the gate terminal of the drive transistor 308. One terminal of the storage capacitor 304 is connected to the gate terminal of the drive transistor 308, and the other terminal of the storage capacitor 304 is connected to the source terminal of the drive transistor 308 and the OLED 302.

A sensing transistor 310 connects the source terminal of the drive transistor 308 and the OLED 302 to the output line (VOUT) 138 which is coupled to the data driver 110 in FIG. 1. The gate terminal of the sensing transistor 310 is connected to the select line input SEL that is controlled by the gate driver 108 in FIG. 1. The effect of temperature on the driver circuit 300 is extracted by monitoring the voltage of the output line 138. The select line input SEL is shared by the switch transistor 306 and the sensing transistor 310. The measurement of the temperature may occur during a blank frame where the gate terminal of the drive transistor 308 is charged to a calibration voltage (VCG) via the data line input. The calibration voltage (VCG) includes the temperature prediction, calculated based on the previous temperature data. During the extraction cycle, the drive transistor 308 acts as an amplifier since it is biased with a constant current through the output voltage (VOUT). The voltage developed on the output voltage (VOUT) as a result of current (Ic) applied to it is $(V_{CD}+\Delta V_{CD})$. Therefore, the effects of temperature on the pixel are amplified, and change of the voltage of the output voltage is a function of the temperature. This enables extraction of very small amount of voltage threshold (VT) shift resulting in highly accurate indication of the temperature of the pixel. The change in the output voltage, VOUT, is monitored. Then, the change(s) in the voltage output, VOUT, is used for determining the temperature of the pixel and thus the calibration of the programming voltage to compensate for the temperature.

The normal operation of the driver circuit 300 includes a programming cycle and a driving cycle. During the programming cycle, the gate terminal of the drive transistor 308 is charged to a calibrated programming voltage using the monitoring result (i.e., the changes of VOUT due to temperature). The charge is held by the charging capacitor 304 and during the driving cycle, the select line SEL is low and the drive transistor 308 provides current to the OLED 302. This operation occurs for all of the driver circuits for the pixels of the pixel array 102. The calibrated programming voltage is determined using the temperature for the selected pixels such as the pixel 104a and an estimated temperature for the non-selected pixels such as pixels 104b-i in the array 102.

Figure 4:
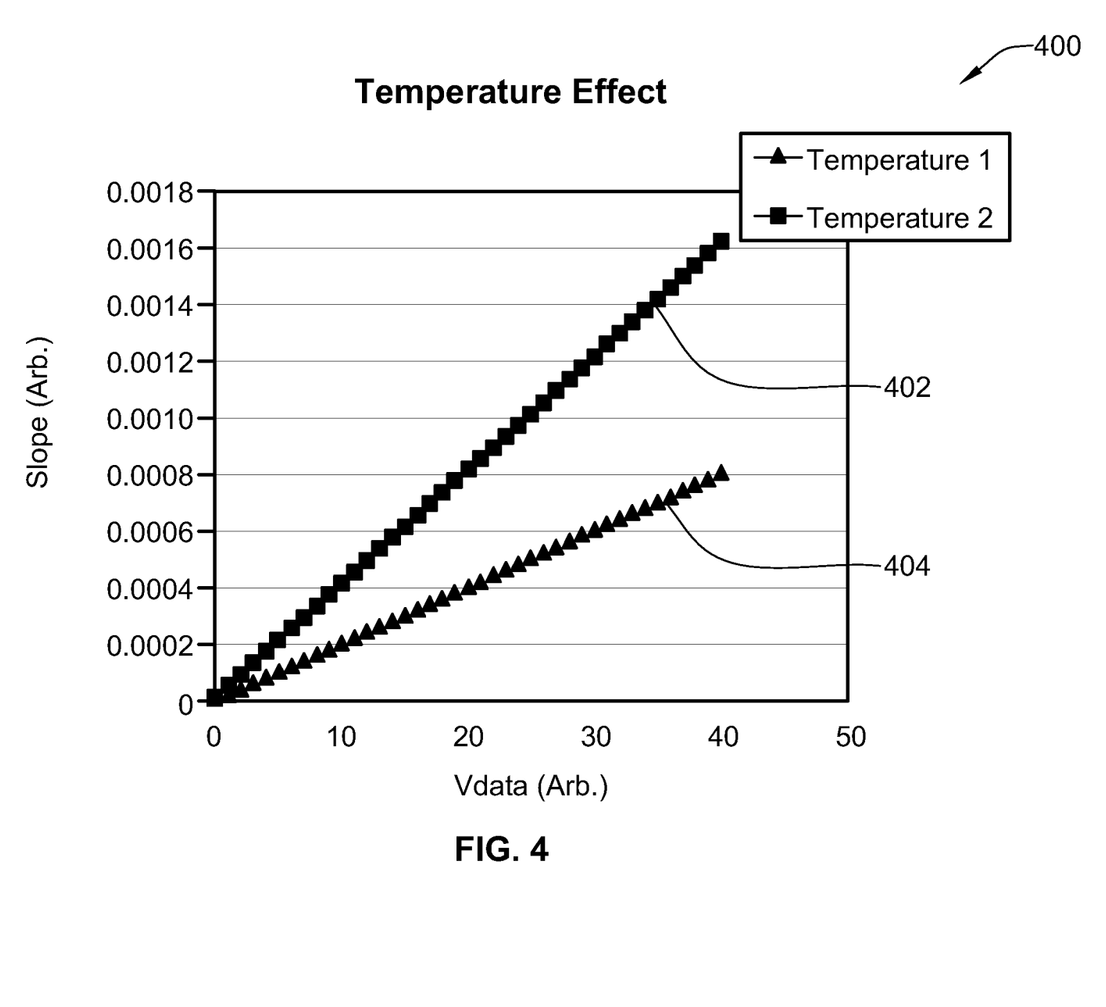
FIG. 4 is a graph showing the effects of temperature on the slope of OLED current over change in programming voltage to the gate of the drive transistor.

FIG. 4 is a graph 400 of the effects the slope of the current of the drive transistor 308 versus the programming voltage level to the data line input VDATA in FIG. 3. The graph 400 includes a first current slope 402 at a first temperature and a second current slope 404 at a second temperature. The slope of the current of the drive transistor 308 is therefore used by the monitor 134 in FIG. 1 to determine the temperature of the pixel. As shown in FIG. 4, temperature affects the performance of the drive transistor 308 significantly by varying the current produced by different levels of programming voltages. Thus, the slope of the IV characteristics of the drive transistor 308 changes by temperature and therefore measuring the output voltage at two points to determine the current at the two points will determine the change. The slope of the current is calculated by $(I_1-I_2)/(V_{data1}-V_{data2})$ where the $I_1$ and $I_2$ are the current of the drive transistor 308 related to programming voltage ($V_{data1}$) at a first point in time and programming voltage ($V_{data2}$) at a second point in time respectively. Thus, any change in the slope can be associated to a particular temperature on the pixel as shown by the different slopes 402 and 404 in FIG. 4.

Once the temperatures of the selected pixels, such as the pixel 104a, are determined whether by a thermal sensor or through measuring the output voltages as described above, the temperature of the remaining non-selected pixels in the array 102 around each of the selected pixels may be interpolated using a number of different techniques including nearest neighbor, bilinear, bicubic or Kriging.

Figure 5A:
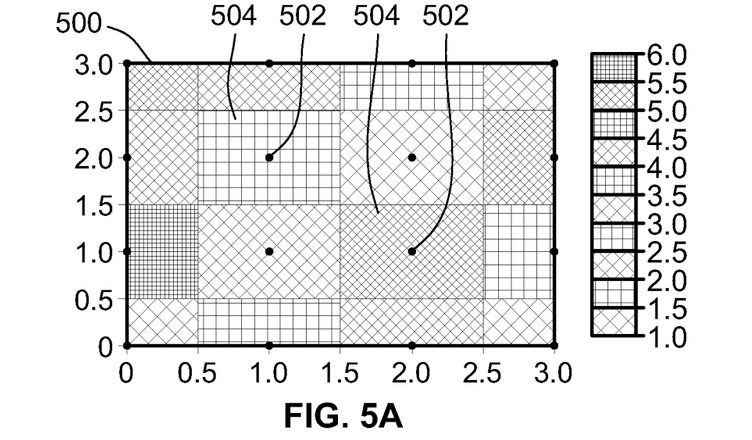
FIG. 5A-5C are thermal graphs of the allocation of temperature on the AMOLED display in FIG. 1 using different interpolation methods.
Figure 5B:
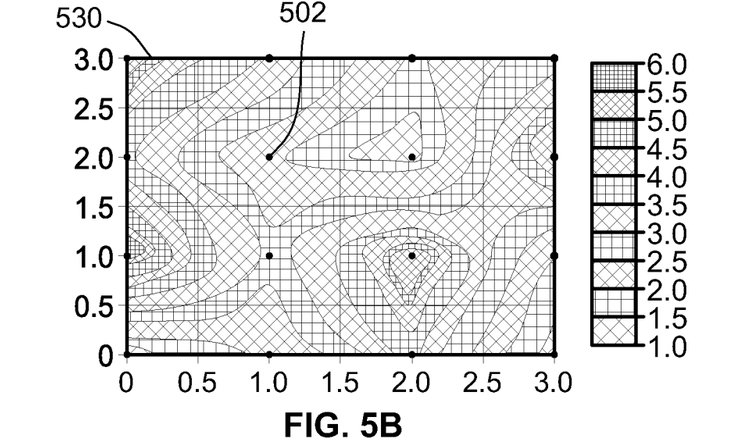

The nearest neighbor interpolation method sets the temperature of all of the neighboring pixels around the selected pixels to the same temperature measured by the pixel. FIG. 5A is a graph 500 showing the temperature determined by the nearest neighbor method. The shades in FIG. 5A represent different temperatures assigned based on the selected T (i, j) is the closest temperature measurement to the left-bottom of the pixel location (x,y). FIG. 5B shows a temperature graph that shows the resulting temperatures assigned to the pixels in the array based on the temperature data using bilinear interpolation from the temperature of the selected pixels. The selected pixels 502 result in a more accurate temperature distribution than the near neighbor method.

Figure 5C:
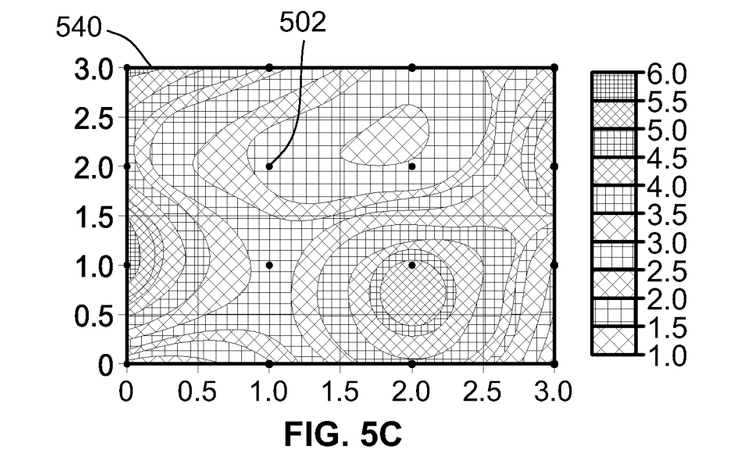

Another method is bicubic interpolation which results in smoother transitions than bilinear interpolation. The bicubic interpolation uses four corners around the selected pixel and their first order derivatives. The bicubic interpolation is up to first derivative continuous as shown in FIG. 5C which shows the estimated temperatures on pixels around the selected pixels 502.

The bicubic interpolation follows the equation $$T(x,y) = \sum_{m=0}^{3}\sum_{n=0}^{3} a_{mn}(x-x_i)^m(y-y_j)^n$$

Where $$\begin{bmatrix} a_{00} \\ a_{10} \\ a_{20} \\ a_{30} \\ a_{01} \\ a_{11} \\ a_{21} \\ a_{31} \\ a_{02} \\ a_{12} \\ a_{22} \\ a_{32} \\ a_{03} \\ a_{13} \\ a_{23} \\ a_{33} \end{bmatrix} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ -3 & 3 & 0 & 0 & -2 & -1 & 0 & 0 & 0 & 0 & 0 & 0 & 0 & 0 & 0 & 0 \\ 2 & -2 & 0 & 0 & 1 & 1 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & -3 & 3 & 0 & 0 & -2 & -1 & 0 & 0 \\ 0 & 0 & 0 & 0 & 0 & 0 & 0 & 0 & 2 & -2 & 0 & 0 & 1 & 1 & 0 & 0 \\ -3 & 0 & 3 & 0 & 0 & 0 & 0 & 0 & -2 & 0 & -1 & 0 & 0 & 0 & 0 & 0 \\ 0 & 0 & 0 & 0 & -3 & 0 & 3 & 0 & 0 & 0 & 0 & 0 & -2 & 0 & -1 & 0 \\ 9 & -9 & -9 & 9 & 6 & 3 & -6 & -3 & 6 & -6 & 3 & -3 & 4 & 2 & 2 & 1 \\ -6 & 6 & 6 & -6 & -3 & -3 & 3 & 3 & -4 & 4 & -2 & 2 & -2 & -2 & -1 & -1 \\ 2 & 0 & -2 & 0 & 0 & 0 & 0 & 0 & 1 & 0 & 1 & 0 & 0 & 0 & 0 & 0 \\ 0 & 0 & 0 & 0 & 2 & 0 & -2 & 0 & 0 & 0 & 0 & 0 & 1 & 0 & 1 & 0 \\ -6 & 6 & 6 & -6 & -4 & -2 & 4 & 2 & -3 & 3 & -3 & 3 & -2 & -1 & -2 & -1 \\ 4 & -4 & -4 & 4 & 2 & 2 & -2 & -2 & 2 & -2 & 2 & -2 & 1 & 1 & 1 & 1 \end{bmatrix} \times \begin{bmatrix} T(x_i, y_i) \\ T(x_{i+1}, y_i) \\ T(x_i, y_{i+1}) \\ T(x_{i+1}, y_{i+1}) \\ T_x(x_i, y_i) \\ T_x(x_{i+1}, y_i) \\ T_x(x_i, y_{i+1}) \\ T_x(x_{i+1}, y_{i+1}) \\ T_y(x_i, y_i) \\ T_y(x_{i+1}, y_i) \\ T_y(x_i, y_{i+1}) \\ T_y(x_{i+1}, y_{i+1}) \\ T_{xy}(x_i, y_i) \\ T_{xy}(x_{i+1}, y_i) \\ T_{xy}(x_i, y_{i+1}) \\ T_{xy}(x_{i+1}, y_{i+1}) \end{bmatrix}$$

pixel temperature. The selected pixels 502 produce temperature measurements either through a temperature sensor or via calculation from output voltages. The temperatures of the neighboring pixels in the surrounding area 504 of the selected pixels 502 are set to the same temperature as the selected pixel 502. This method is computationally simple, but not as accurate as more complex methods of interpolation.

Another method is bilinear interpolation where the temperature of the pixels are determined by linear interpolation in both x and y directions from the selected pixel. Therefore, the interpolation is continuous, as shown by the equation below.

$$T(x,y) = \left( \begin{array}{c} T(x_i, y_i)(z_{i+1}-x)(y_{i+1}-y) + T(z_{i+1}, y_i)(x-x_i)(y_{i+1}-y) + \\ T(x_i, y_{i+1})(x_{i+1}-x)(y-y_i) + T(x_{i+1}, y_{i+1})(x-x_i)(y-y_i) \end{array} \right) \Big/ ((x_{i+1}-x_i)(y_{i+1}-y_i))$$

The x and y subscripts indicate the derivative of temperature in x and y directions. These derivatives may be calculated from the measurements from the selected pixels, using the finite difference method. For example, $$T_x(x_i, y_i) = \frac{T(x_{i+1}, y_i) - T(x_{i-1}, y_i)}{2d_x}$$

Where $d_x$ is the x-distance between two adjacent selected pixels with thermal sensors or selected pixels with voltage readings.

Another method is Kriging (Wiener-Kolmogorov Prediction) which is a least square estimation method that inter polates the temperature of each pixel as a linear weighted sum of all temperature measurements, as follows:

$$T(z^*) = \sum_{i=1}^{n} \lambda_i(z^*)T(z_i)$$

In this equation, T(z*) is the temperature of the pixel of interest, T ($z_i$) are measured temperatures by n sensors or derived from the voltage output of selected n pixels. $\lambda_i(z^-)$ are the coefficients of Kriging. The assumption of Kriging is that the random field is spatially correlated. This is a valid assumption for temperature profile as the temperature is a low pass filtered 2-D signal of power consumption in space domain. The low pass filtering removes the high frequency harmonies and leave the thermal profile with low frequency harmonies leading to high correlation among close pixels. The closer the pixels are, the higher is the correlation.

The Kriging coefficients may be calculated using the variogram of temperature. The variogram between two points $z_1$ and $z_2$ is defined as $$\gamma(z_1, z_2) = E[(T(z_1) - T(z_2))^2] \begin{bmatrix} \lambda_1(z^*) \\ \vdots \\ \lambda_n(z^*) \\ \mu \end{bmatrix} =$$

$$\begin{bmatrix} \gamma(z_1, z_1) & \cdots & \gamma(z_1, z_n) & 1 \\ \vdots & \ddots & \vdots & \vdots \\ \gamma(z_n, z_1) & \cdots & \gamma(z_n, z_n) & 1 \\ 1 & \cdots & 1 & 0 \end{bmatrix}^{-1} \times \begin{bmatrix} \gamma(z_1, z^*) \\ \vdots \\ \gamma(z_n, z^*) \\ 1 \end{bmatrix}$$

The Kriging coefficients may be pre-calculated and stored in memory coupled to the controller 112 to reduce the interpolation computation cost to evaluation of an additive equation as explained above.

Whether a very simple interpolation method such as bilinear or a very complex one such as bicubic is used, the required computation increases for a full panel display with millions of pixels. However, the temperature profile has a large time-constant and therefore the thermal profile of panel may be updated progressively as the video is processed.

An alternative method of determining the temperature profile of the pixels calculates the thermal profile from the video data from the AMOLED display system 100. The temperature profile is obtained via video data from the AMOLED display system 100 as follows. The heat conduction and temperature are governed by the following heat diffusion equation:

$$\rho c_p \frac{\partial T(x, y, z, t)}{\partial t} - \nabla \cdot (k(x, y, z, T)\nabla T(x, y, z, t)) = P(x, y, z, t) \quad (1)$$

with two boundary conditions depending on the packaging material and surrounding environment. For the insulated condition:

$$\frac{\partial T(x, y, z, t)}{\partial n_i} = 0 \quad (2)$$

and for the convective condition $$k(x, y, z, T)\frac{\partial T(x, y, z, t)}{\partial n_i} = h(T(x, y, z, t) - T_a) \quad (3)$$

Where T is the temperature in Celsius, P is the power density in Watts per meters³, k is the thermal conductivity W° C./m³ ρ is the density of the material (kg/meters³), $c_p$ is the specific heat $$\frac{J}{(Kg \cdot {}^\circ C.)},$$

$h_z$ is the convective heat transfer coefficient, and $n_i$ is the outward direction normal to the surface of i.

Figure 6:
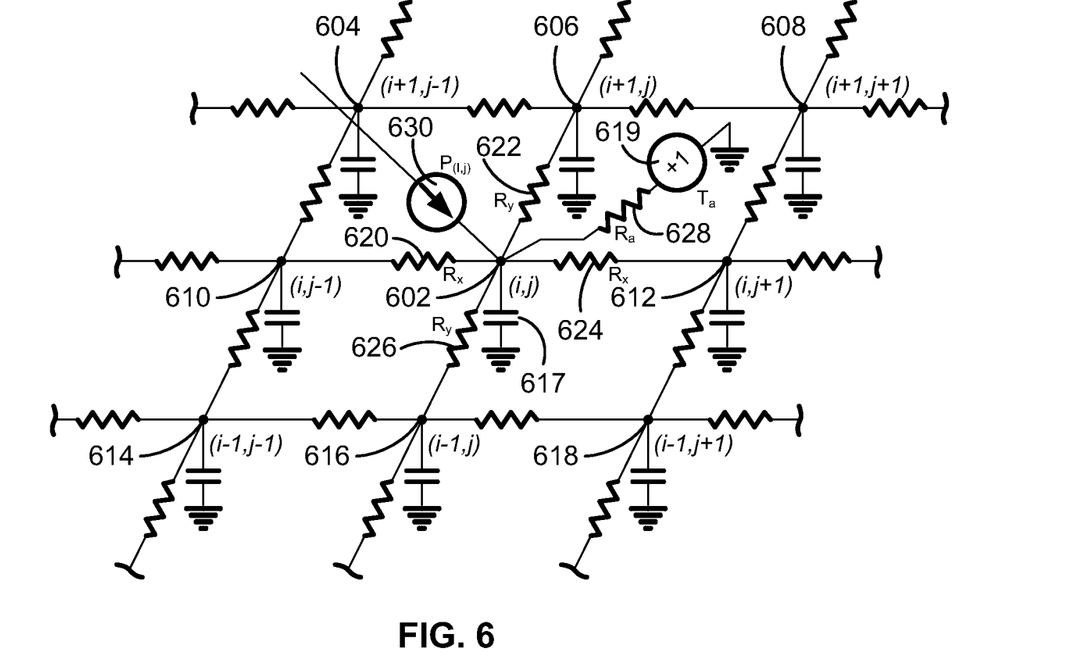
FIG. 6 is an equivalent circuit model for another method of thermal compensation for the AMOLED display in FIG. 1.

By using the finite difference method (FDM), the partial differential equation of (1) may be reduced to an equivalent circuit analysis problem and solved numerically by the model circuit 600 in FIG. 6. In such a model, capacitances and resistances are used to model material specific heat, density, conduction, and environment convection. The power consumption and temperature are also modeled by current sources and nodal voltages. In this manner the thermal effect may be calculated from video data. The video data determines the power consumption of each pixel, therefore, by solving the equivalent circuit of FIG. 6, the thermal profile which is equivalent to nodal voltage profile is calculated. The calculation may be performed by the controller 112 in FIG. 1, but other hardware and/or software may perform the computations such as a video processor or a digital signal processor on a device coupled to the display system 100.

The thermal-model equivalent electrical circuit 600 of a pixel (i, j) such as the pixel node 602 surrounded by 8 neighboring pixel nodes 604, 606, 608, 610, 612, 614, 616 and 618 is shown in FIG. 6. Each node 602, 604, 606, 608, 610, 612, 614, 616 and 618 thus represents a pixel. The node 602 has a series of resistors 620, 622, 624 and 626 each of which represent the model of thermal components from other nodes 610, 606, 612 and 616, respectively representing other pixels around the pixel represented by the node 602.

It is assumed that each pixel such as the node 602 has width, length, and substrate thickness of w, l, t meters. Then, the temperature $T_a$ of the pixel (i,j) consuming power density of $P_{(i,j)}$ is equivalent of the voltage of that node, if:

$$C = \rho c_p wlt \quad (4)$$

$$R_x = \frac{w}{klt}$$

$$R_y = \frac{l}{kwt}$$

$$R_a = \frac{1}{hwl}$$

In this example the $R_x$ value is expressed in resistors 620 and 624, $R_y$ is expressed in resistors 622 and 626, and $R_a$ is expressed in a resistor 628. The power density $P_{(i,j)}$ is modeled as a power source 630. The temperature of the node $T_a$ is modeled as a voltage source 632 and is solved for by the electrical circuit model 600.

The circuit 600 in FIG. 6 is repeated in x and y directions of the array 102 in FIG. 1 until reaching the edges of the panel. If the edges are considered to be thermally insulated, the lateral resistances at the edge pixels to the outside are set to zero. The convection resistance ($R_a$) is temperature dependent.

Once such a model is produced, the thermal profile may be constructed for a video stream based on the power consumption characteristic of a pixel such as the pixel 104*a* in FIG. 1 in terms of displaying gray-level light intensity. However, the exact nodal analysis of such a large mesh with millions of electrical elements is impractical in real-time (60 image frames or more in a second). The thermal profile may be considered as a low pass filtered signal of the power consumption profile, both in time and space. The thermal conduction/convective resistance network is capable of eliminating and damping the thermal effect of locally high power consumption patterns and flattens the temperature profile. This may be counted as a low pass filtering of the power consumption profile in x-y space. The thermal capacitances are also responsible to damp the effect of temporal power consumption spikes and low pass filtering in time.

In a steady-state case (zero thermal capacitances or time-invariant power consumption profile), a 2-D system transformation function can be constructed to extract the steady-state thermal profile from a pixel. In that case, the 2-D Discrete Cosine Transformation (DCT) of the power consumption is multiplied with such a system transformation function. The output of such a transformation can then be inverse discrete cosine transformed to obtain the steady-state thermal profile. Such a 2-D system transformation function may be generated using the Green function-based solution of thermal equations. Moreover, in the transient case, the thermal behavior of each pixel can be approximated with a very low-order time-domain filer using a model order reduction technique for an integrated circuit.

Figure 7:
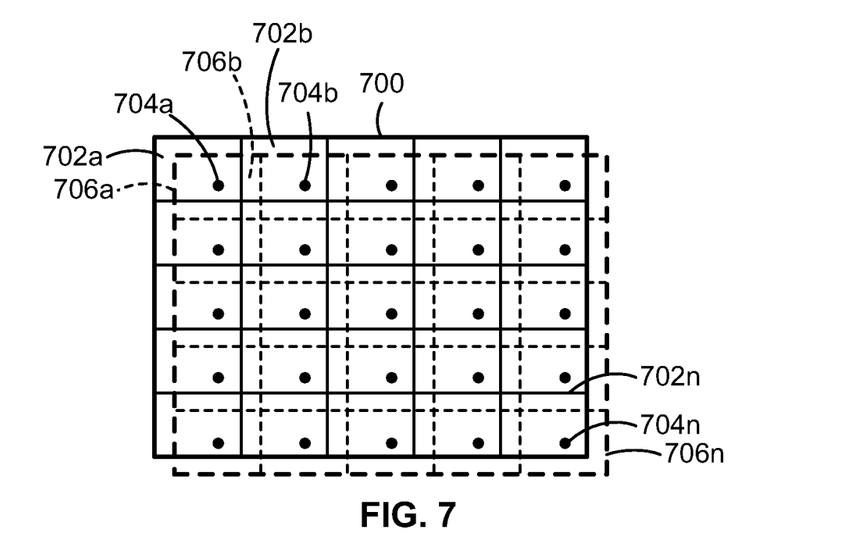
FIG. 7 is a diagram of a thermal sensor grid for one mechanism of thermal compensation for the AMOLED display in FIG. 1.

Since temperature profile is basically a low pass filtered of power consumption profile, in space and time domains the following algorithm may be used to significantly reduce the computational cost of the thermal profile extraction of OLED displays, to enable real-time thermal profile extraction by only performing the transformation for selected pixels in the display system 100. FIG. 7 is a graphic of the display 700 showing the process of dividing the display 700 and selecting certain pixels for thermal profile extraction from the power levels of pixels in the AMOLED display.

The array of pixels of the display 700 is divided to M×K squares 702*a*, 702*b*, to 702*n* as shown by the solid lines in FIG. 7. Each of the M×K squares contains N×N pixels. A pixel such as the pixel 704*a* is randomly selected from the square 702*a* of N×N pixels. Pixels 704*b* . . . 704*n* with the same local location within the grid squares M×K 702*b* . . . 702*n* as the pixel 704*a* are selected as shown by the solid points 704*b* . . . 702*n* in FIG. 7. A set of new N×N pixel squares 706*a*, 706*b* . . . 706*n* are created such that each selected pixel 704 is placed in the middle of each new square 706*a*, 706*b* . . . 706*n*. The new squares 706*a*, 706*b* . . . 706*n* are shown by dashed lines in FIG. 7. A new frame is then fetched and the power consumption of each selected pixel 704*a*-704*n* is calculated.

The power consumption of all pixels in each dashed-line square 706*a*, 706*b* . . . 706*n* in FIG. 7 is assumed to be equal to the power consumption of the selected (middle) pixel 704*a*, 704*b* . . . 704*n*. Steady-state thermal analysis is performed for the assumed course-grain squares 706*a*, 706*b* . . . 706*n* in FIG. 7, by applying the low resolution DCT-based transformation. For example, if the 2-D transformation matrix of the display (obtained from green-function based analysis) is $F_{M \times K}$, and the power consumption is $P_{M \times K}$, then the steady-state temperature is:

$$T_s = IDCT(DCT(P_{M \times K}) * F_{M \times K}) + T_e$$

Where $T_e$ is the environment temperature, and '*' is element-wise multiplication of two matrices. DCT and IDCT are the discrete cosine transform and the inverse-DCT operations.

The full resolution steady-state temperature profile for the other pixels in the squares 706*a*-706*n* is constructed by nearest-neighbor, bilinear, or bicubic interpolation from the profiles of the selected pixels 704*a*-704*n* by the general process explained above. The steady-state (infinite-time) response is then used to calculate the temperature of each pixel, at the end of the current frame, by using the reduced-order time-domain (temporal) thermal model. For example, if the temporal model is a first-order model, the temperature at the end of current frame is:

$$T = T_o + (T_s - T_o)\left(1 - e^{-\frac{t_f}{\tau}}\right) \qquad (6)$$

where $T_o$ is the temperature profile at the beginning of the frame and $t_f$ is the duration of the frame. The controller then loops back to randomly select another pixel within the grids 702*a*-702*n* in the array 700. A new set of squares is then centering on randomly selected pixel. In this manner, distortions due to localized temperatures may be minimized.

The above described methods of determining temperature of the pixels in the array may be performed by a processing device such as the 112 in FIG. 1 or another such device which may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example temperature determination methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible, non-transient media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the temperature determination methods could be implemented by software, hardware, and/or firmware. Also, some or all of the machine readable instructions represented may be implemented manually.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A semiconductor display device, comprising:
   a plurality of select lines;
   a plurality of pixels arranged in an array, each pixel coupled to a select line of the plurality of select lines and including a drive transistor and an organic light emitting device coupled to the drive transistor, the plurality of pixels including a first pixel and one or more second pixels; and
   a controller coupled to the plurality of pixels via the plurality of select lines, and configured to:
      select each pixel of the plurality of pixels with a corresponding select line of the plurality of select lines that each pixel of the plurality of pixels is coupled to for programming each pixel of the plurality of pixels to control the brightness thereof;
      select a thermal transistor of each second pixel with use of the select line coupled to the second pixel and measuring an output from the thermal transistor to determine one or more pixel temperatures of the one or more second pixels; and
      estimate a temperature of the first pixel at a first time with use of the one or more pixel temperatures determined for the one or more second pixels.

2. The semiconductor display device of claim 1 wherein the one or more second pixels are in the form of a spaced array.

3. The semiconductor display device of claim 1, wherein the controller is configured to estimate the temperature of the first pixel by interpolating the determined one or more pixel temperatures of the one or more second pixels to the first pixel, the interpolation including one of nearest neighbor, bilinear, bicubic, or Kriging.

4. The semiconductor display device of claim 1, wherein the controller is configured to compensate the programming of the first pixel to offset the effect of the estimated temperature on the first pixel.

5. The semiconductor display of claim 1, wherein the output of the thermal transistor of each one or more second pixel is a function of the effect of the pixel temperature of the one or more second pixel on the thermal transistor.

6. The semiconductor display device of claim 1, wherein the controller is configured to measure pixel temperatures of each of the one or more second pixels during at least one blank frame during which a gate terminal of a drive transistor of each of the one or more second pixels is charged to a calibration voltage via a respective data line input to produce a drive transistor output voltage provided to the thermal transistor for producing the output of the thermal transistor which is used by the controller to determine the pixel temperature of each of the one or more second pixels.

7. A method of determining temperature of a first pixel of a display including a controller, a plurality of select lines, and a plurality of pixels arranged in an array, each pixel of the plurality of pixels coupled to a select line of the plurality of select lines and including a drive transistor and an organic light emitting device coupled to the drive transistor, the plurality of pixels including the first pixel and one or more second pixels, each pixel of the plurality of pixels selected and programmed by the controller with use of the select line coupled to the pixel to control the brightness of the pixel, the method comprising:
   determining by the controller one or more pixel temperatures of the one or more second pixels by selecting a thermal transistor of each second pixel with use of the select line coupled to the second pixel and measuring an output from the thermal transistor; and
   estimating by the controller a temperature of the first pixel at a first time with use of one or more pixel temperatures determined for the one or more second pixels.

8. The method of claim 7 wherein the one or second pixels are in the form of a spaced array.

9. The method of claim 7, wherein the estimating the temperature of the first pixel by interpolating the determined one or more pixel temperatures of the one or more second pixels to the first pixel, the interpolation including one of nearest neighbor, bilinear, bicubic or Kriging.

10. The method of claim 7, further comprising compensating the programming of the first pixel to offset the effect of the estimated temperature on the first pixel.

11. The method of claim 7, wherein the output of the thermal transistor of each one or more second pixel is a function of the effect of the pixel temperature of the one or more second pixel on the thermal transistor.

12. The method of claim 7, further comprising measuring by the controller temperatures of each of the at least one second pixel during at least one blank frame during which a gate terminal of a drive transistor of each of the one or more second pixels is charged to a calibration voltage via a respective data line input to produce a drive transistor output voltage provided to the thermal transistor for producing the output of the thermal transistor which is used by the controller to determine the pixel temperature of each of the one or more second pixels.

* * * * *

UNITED STATES PATENT AND TRADEMARK OFFICE
CERTIFICATE OF CORRECTION

PATENT NO. : 10,971,068 B2  
APPLICATION NO. : 16/576892  
DATED : April 6, 2021  
INVENTOR(S) : Javid Jaffari, Gholamreza Chaji and Tong Liu Page 1 of 1

It is certified that error appears in the above-identified patent and that said Letters Patent is hereby corrected as shown below:

In the Claims

Column 14, Line 33, Claim 9:
Insert after "temperature of the first pixel" -- is performed --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*